United States Patent [19]

Mitsumori

[11] Patent Number: 5,073,883
[45] Date of Patent: Dec. 17, 1991

[54] OBJECTIVE LENS DRIVING APPARATUS INCLUDING PARALLALOGRAM STRUCTURE

[75] Inventor: Koji Mitsumori, Tokyo, Japan
[73] Assignee: Sony Corporation, Tokyo, Japan
[21] Appl. No.: 291,950
[22] Filed: Dec. 29, 1988

[30] Foreign Application Priority Data

Jan. 27, 1988 [JP] Japan .................. 63-016271
Jan. 29, 1988 [JP] Japan .................. 63-019396

[51] Int. Cl.$^5$ ............................................. G11B 7/09
[52] U.S. Cl. .............................. 369/44.15; 369/44.22; 359/814; 359/824
[58] Field of Search ............... 369/44.15, 44.16, 44.22, 369/112; 350/247, 252, 255

[56] References Cited

U.S. PATENT DOCUMENTS

| | | | |
|---|---|---|---|
| 4,616,355 | 10/1986 | Kasahara | 369/44.16 |
| 4,633,456 | 12/1986 | Luecke | 369/44.16 |
| 4,696,566 | 9/1987 | Sekimoto et al. | 369/44.15 X |
| 4,766,583 | 8/1988 | Oinoue et al. | 369/44.16 X |
| 4,794,580 | 12/1988 | Ikedo et al. | 369/44.16 |
| 4,813,033 | 3/1989 | Baasch et al. | 369/44.16 |
| 4,861,138 | 8/1989 | Suzuki | 369/44.22 X |

FOREIGN PATENT DOCUMENTS 0178077 4/1986 European Pat. Off. .
0212941 3/1987 European Pat. Off. .

Primary Examiner—Roy N. Envall, Jr.
Assistant Examiner—W. R. Young
Attorney, Agent, or Firm—Lewis H. Eslinger; Jay H. Maioli

[57] ABSTRACT

An objective lens driving apparatus has a driving mechanism for moving a bobbin provided with an objective lens in a direction parallel to the optical axis of the objective lens and in a direction perpendicular to the optical axis of the objective lens. Each of first and second supporting members comprises a pair of hinge portions and parallel links coupling the hinge portions for supporting the bobbin so that it is movable in the direction parallel to the optical axis and in the direction perpendicular to the optical axis. The first and second supporting members are attached to a frame, and the bobbin is movable in the direction parallel to the optical axis by the first and second supporting members and in the direction perpendicular to the optical axis by a third parallel link formed of the bobbin, the first and second supporting members and a part of the frame.

28 Claims, 7 Drawing Sheets

OBJECTIVE LENS DRIVING APPARATUS INCLUDING PARALLALOGRAM STRUCTURE

BACKGROUND OF THE INVENTION

1. Field of the Invention

This invention relates generally to an objective lens driving apparatus, and more particularly to such apparatus which is adapted to drive an objective lens for converging a light beam emitted from, for example, a light source on the signal recording plane of an optical disc in the focus direction and tracking direction or in one of these directions.

2. Description of the Prior Art

There have conventionally been proposed an objective lens driving apparatus which is constructed such that a movable body to which an objective lens is attached is supported by a single supporting arm having a hinge and a parallel link on a base (see U.S. Pat. No. 4,766,583) and another one which is constructed, as shown in FIG. 1, such that a bobbin 4 supporting an objective lens 1 and having a driving coil 2 for focusing control and a driving coil 3 for tracking control is disposed between magnets 6 arranged opposite to each other on a base 5 which serves as a yoke and supported in a cantilever manner by supporting rods 8 made of metal having resiliency and respectively fixed to upper right, upper left, lower right and lower left portions of the front surface of a fixing plate 7 implanted on the base 5 such that they are in parallel to each other in a cantilever manner.

In the latter one, the bobbin 4 is moved by the resilient displacement of the supporting rods 8 which is caused by supplying a driving current to the driving coil 2 for focusing control or the driving coil 3 for tracking control and consequently the objective lens 1 supported by the bobbin 4 is moved on the basis of a focusing error signal or a tracking error signal in the focusing direction (the direction of the optical axis of the objective lens 1 or the direction parallel to the optical axis) or the tracking direction (the direction perpendicular to the optical axis of the objective lens 1 or the plane direction perpendicular to the optical axis).

The former of the above-mentioned prior art devices, that is, the objective lens driving apparatus as disclosed in U.S. Pat. No. 4,766,583, has the hinge of the supporting arm positioned at the rotating center of the movable body, which causes restriction to the form of the movable body. For example, the freedom in the location of the optical system is decreased when the apparatus is integrally driven, consequently presenting difficulties on making the apparatus thinner.

On the other hand, according to the latter one, that is, the objective lens driving apparatus as shown in FIG. 1, since it adapts a cantilever spring supporting system, the interval between the upper and lower resilient supporting rods is decreased as the apparatus is made thinner, thus presenting obstacles such as that the optical axis of the objective lens is readily inclined. Further, when it is integrally driven, it requires additional signal line lead-out method so that the construction is made complicated. Moreover, four resilient supporting rods do not allow setting the vibration characteristics independently to the focusing direction and the tracking direction, thereby incurring troubles such as that the operation lacks smoothness.

OBJECTS AND SUMMARY OF THE INVENTION

The present invention was made in view of the above-mentioned problems inherent in the prior art devices, and its object is to provide an objective lens driving apparatus which is capable of providing a large freedom in the shape of a movable body which supports an objective lens, being made thinner and setting the vibration characteristic independently to the focusing direction and the tracking direction to thereby extend the setting range.

According to a first aspect of the the present invention there is provided an objective lens driving apparatus comprising:

a movable body to which at least an objective lens is attached;

electromagnetic driving means for driving the objective lens in the direction parallel to the optical axis of the objective lens and in the direction perpendicular to the optical axis;

first and second supporting members each having a pair of hing portions and first and second parallel links coupling the pair of hinge portions; and a frame to which the first and second supporting members are attached, wherein the objective lens is arranged movable in the direction parallel to the optical axis of the objective lens by the respective parallel links of the first and second supporting members and the objective lens is arranged movable in the direction perpendicular to the optical axis of the objective lens by a third parallel link formed of the movable body, a part of the frame and the first and second supporting members.

According to a second aspect of the present invention, there is provided an optical pickup apparatus comprising:

a movable body to which a laser light source, an objective lens, optical parts for introducing a light beam from the laser light source to the objective lens and a light receiving element for receiving the light beam which passes through the objective lens and the optical parts are attached;

electromagnetic driving means for driving the movable body in the direction parallel to the optical axis of the objective lens and in the direction perpendicular to the optical axis;

first and second supporting members respectively formed of a pair of hinge portions and first and second parallel links coupling the pair of hinge portions for supporting the movable body; and a frame to which the first and second supporting members are attached, wherein the movable body is arranged movable in the direction parallel to the optical axis of the objective lens by the respective parallel links of the first and second supporting members and the objective lens is arranged movable in the direction perpendicular to the optical axis of the objective lens by a third parallel link formed of the movable body, a part of the frame and the first and second supporting members.

The above and other objects, features and advantages of the present invention will become apparent from the following detailed description of the preferred embodiment taken in conjunction with the accompanying drawings, throughout which like reference numerals designate like elements and parts.

DETAILED DESCRIPTION OF THE PREFERRED EMBODIMENTS

A first embodiment of the present invention, which is adapted to an optical pickup, will hereinafter be described with reference to the accompanying drawings.

Figure 1:
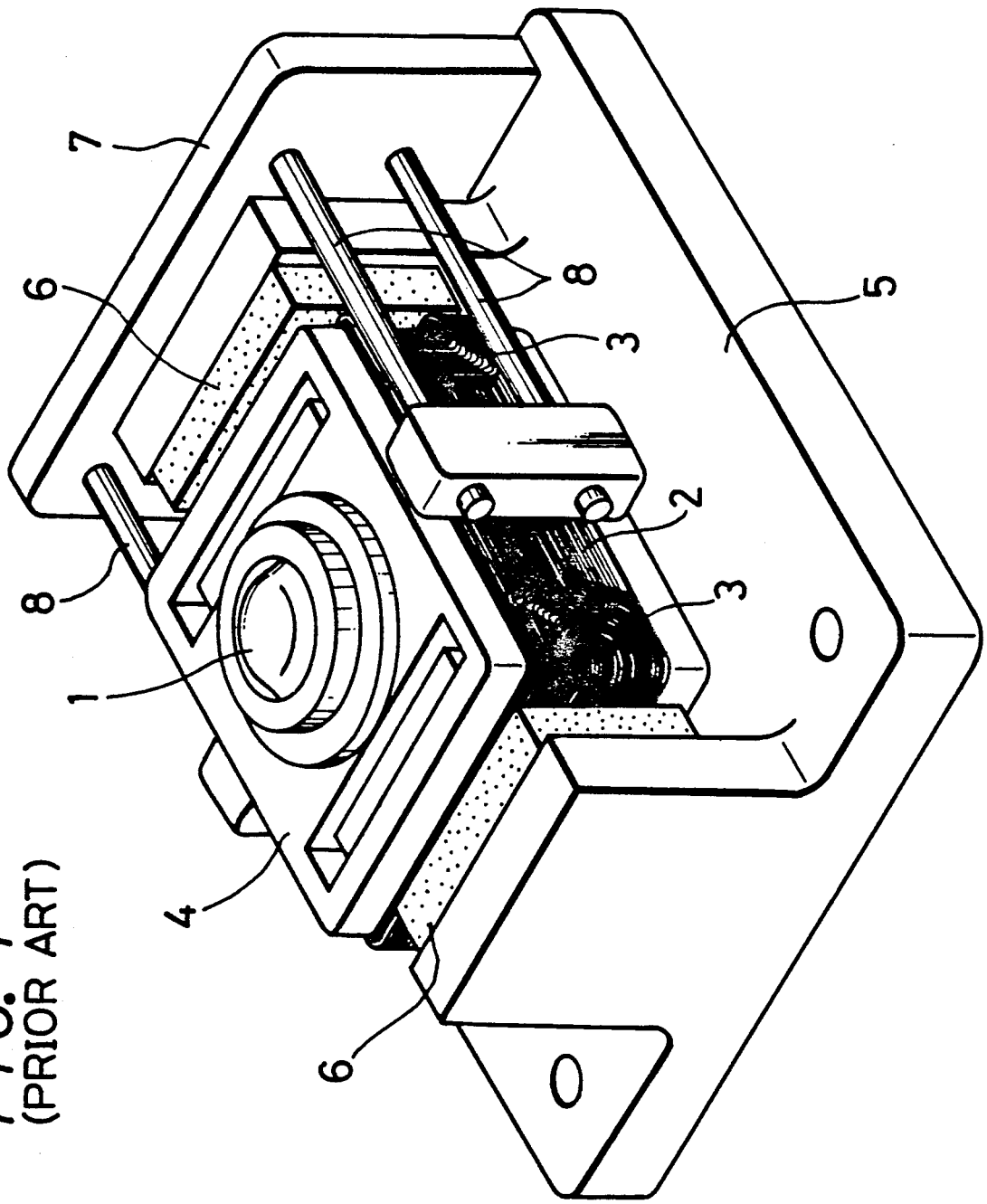
FIG. 1 is a perspective view showing a prior art objective lens driving apparatus.
Figure 2:
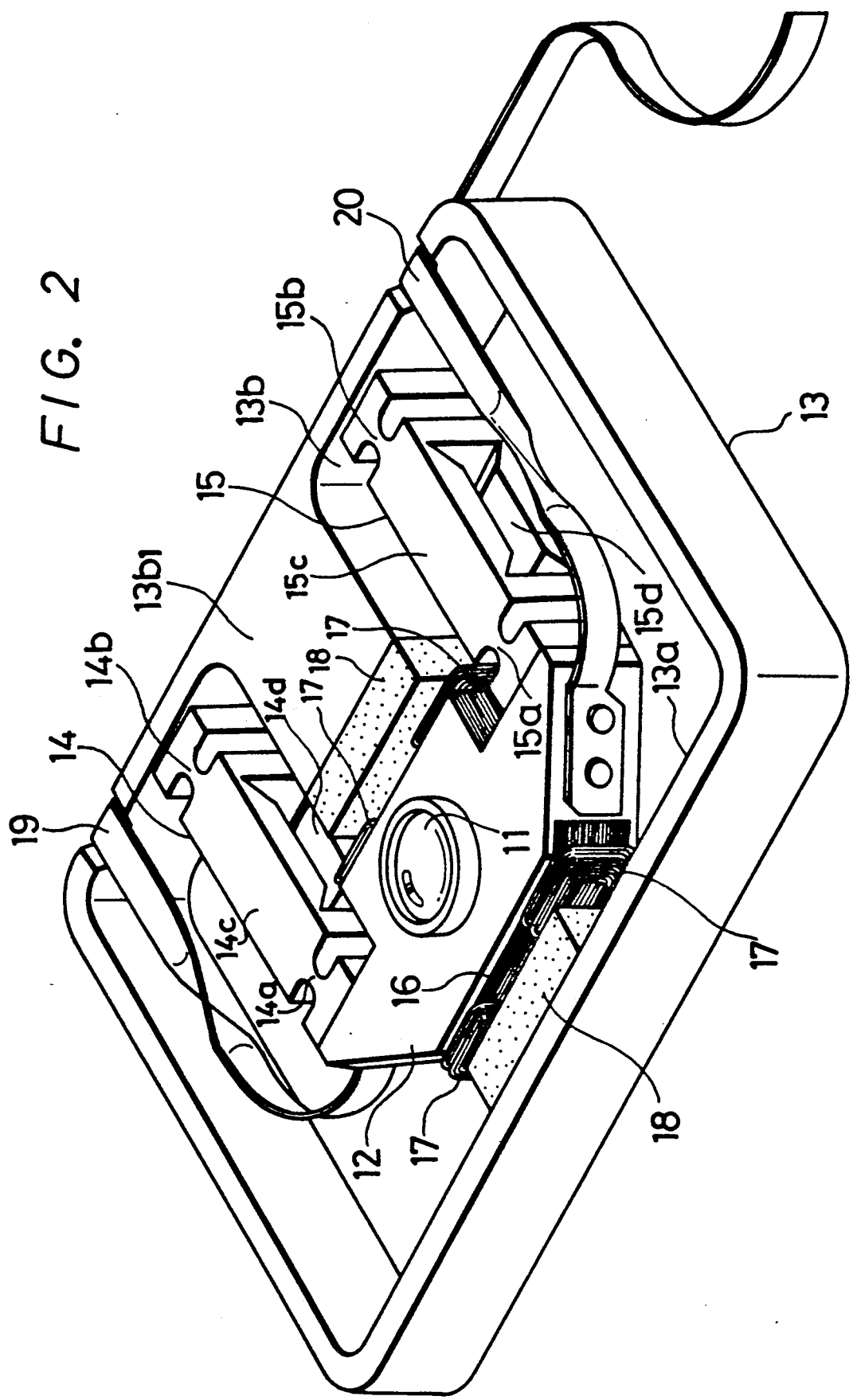
FIG. 2 is a perspective view showing a first embodiment of an objective lens driving apparatus according to the present invention.

An objective lens driving apparatus of the first embodiment as shown in FIG. 2 is constructed such that a bobbin 12 supporting an objective lens 11 as a movable body is supported through first and second supporting members 14 and 15 to a yoke 13 as a frame movably in the direction parallel to the optical axis of the objective lens 11, that is, the focusing direction and in the direction perpendicular to the optical axis, that is, the tracking direction.

The bobbin 12 in the above construction is made of synthetic resin such as ABS resin or the like which has heat durability and high rigidity. The objective lens 11 is supported on the central portion of the upper surface of the bobbin 12, with its optical axis directed vertically. A driving coil 16 for focusing control is wound on the outer periphery of the bobbin 12 in the direction perpendicular to the optical axis. Also, a driving coil 17 for tracking control wound in a substantially rectangular shape is attached, by junction or the like, on the front and rear faces of the the driving coil 16 and on both sides thereof.

The yoke 13 is formed as a quadrilateral frame which surrounds the bobbin 12 with a predetermined spacing therebetween. On the inner surface of inner front and rear sides 13a and 13b of the yoke 13 there are secured magnets 18 opposite to the driving coil 16 for focusing control and the driving coil 17 for tracking control with a predetermined distance therebetween. These magnets 18 and the yoke 13 constitute an open magnetic circuit. The inner surface of the rear side 13b of the yoke 13 is provided with a protrusion $13b_1$ to which one of the magnets 18 is fixed on the inner end face thereof to maintain a predetermined spacing with the coils 16 and 17.

The arm members 14 and 15 for supporting the bobbin 12 to the yoke 13 as the frame, are made of elastic synthetic resin and have a pair of hinge portions $14a$, $14b$ and $15a$, $15b$ and parallel links $14c$, $14d$ and $15c$, $15d$, respectively.

Figure 3A:
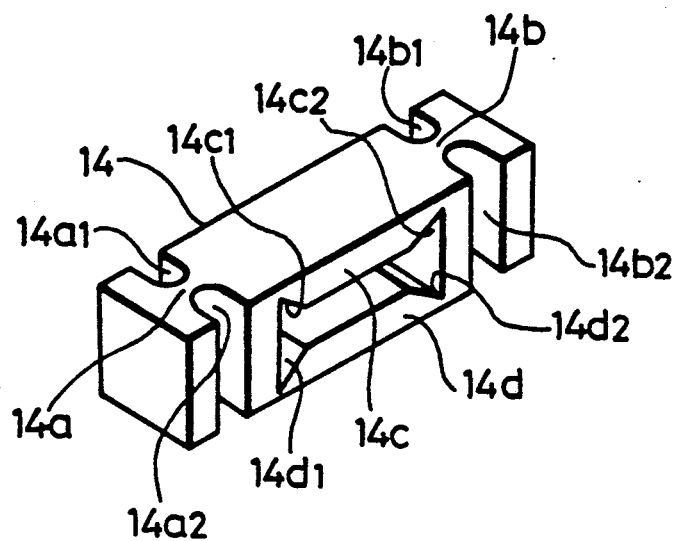
FIGS. 3A-3C are respectively a perspective view, a plan view and a side view of an arm member employed in the apparatus shown in FIG. 2.
Figure 3B:
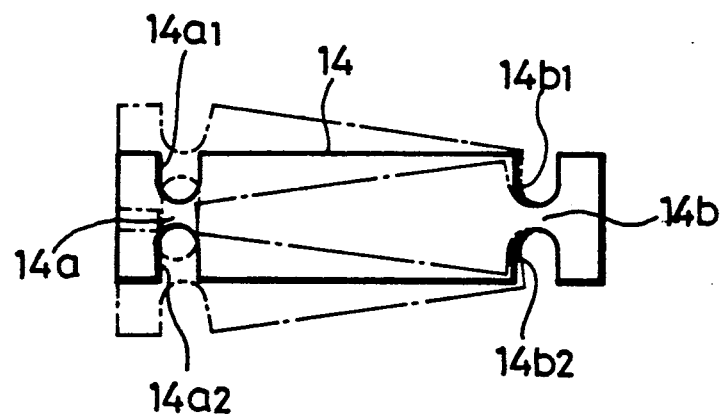

The arm members 14 and 15 are symmetrically formed so that only one of them, i.e. the arm member 14, will be hereinafter explained in detail with reference to FIGS. 3A-3C. As shown in the perspective view of FIG. 3A, a pair of the hinge portions $14a$ and $14b$ are formed at front and rear end portions of the arm member 14 by forming resesses $14a_1$, $14a_2$ and $14b_1$, $14b_2$ in both side faces. The arm member 14 is bent and swung at the pair of the hinge portions $14a$ and $14b$ as shown by one-dot chain lines in FIG. 3B. The parallel links $14c$ and $14d$ are positioned between the hinge portions $14a$ and $14b$ formed in the direction perpendicular to the direction in which the arm member 14 is bent around the hinge portions.

Figure 3C:
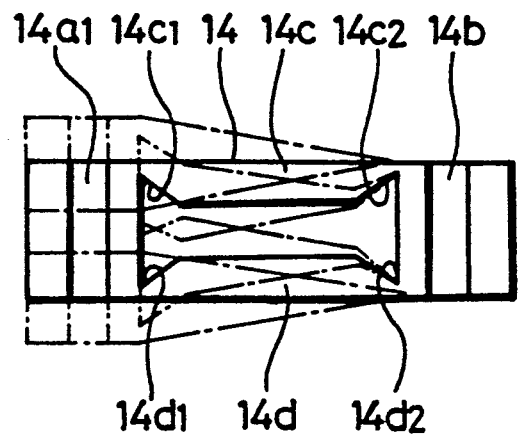

The parallel links $14c$ and $14d$ are provided with flexible portions $14c_1$, $14c_2$ and $14d_1$, $14d_2$, respectively, in the front and rear end portions thereof, formed concavely, in a manner that the arm member 14 can be smoothly parallelly swung as shown by one-dot chain lines in FIG. 3C.

The arm members 14 and 15 are disposed in the yoke 13 with the protrusion $13b_1$ interposed therebetween and fixed at their rear end surfaces such that the parallel links $14c$, $14d$ and $15c$, $15d$ are in a condition corresponding to the optical axis of the objective lens 11. The front surfaces of the arm members 14 and 15 are secured to both side portions of the rear surface of the bobbin 12, whereby the bobbin 12 is supported by the yoke 13.

Also, band-formed flexible printed circuit boards 19 and 20 on which a predetermined number of wiring patterns are printed are connected to both side portions of the bobbin 12 as power supply leaders.

The flexible printed circuit boards 19 and 20 are fixed to the yoke 13 on the upper edge of the rear wall portion $13b$ and lead out to the outside in a condition that they are distorted by 90°.

Such distortion given to the flexible printed circuit boards 19 and 20 allows the same to remove the directional property. Thus, it can be avoided that the bobbin 12 tends to move readily in a particular direction but is prevented from moving in the direction perpendicular to the readily movable direction due to the elasticity of the flexible printed circuit boards, as will be later referred to.

The objective lens driving apparatus of the present embodiment constructed as mentioned above generates a driving force which moves the bobbin 12 in the upward or downward direction, that is, in the direction parallel to the optical axis of the objective lens 11 attached to the bobbin 12 (focus direction) by the interlink of the magnetic flux from the magnets 18 forming the magnetic circuit and the magnetic flux generated from the driving coil 16 wound around the bobbin 12 for the focusing control when the driving coil 16 is supplied with a driving current through the flexible printed circuit boards 19 and 20 as power supply leaders.

The arm members 14 and 15 supporting the bobbin 12 to the yoke 13, as described above, are bent and swung by upward and downward parallel movements of the upper and lower parallel links $14c$, $14d$ and $15c$, $15d$ at the flexible portions thereof, whereby the bobbin 12 is given a parallel displacement in the upward or downward direction, and consequently the objective lens 11 is moved in the focusing direction. In this event, the flexible printed circuit boards 19 and 20 flexibly move with a telescopic elasticity of the distorted portions thereof in the horizontal plane, whereby the bobbin 12 can be displaced without any trouble.

When the driving coil 17 for tracking control is supplied with the driving current through the flexible printed circuit boards 19 and 20, a driving force which moves the bobbin 12 in the lateral direction, that is, the direction perpendicular to the optical axis of the objective lens 11 (tracking direction) is generated by the interlink of the magnetic flux generated from the driving coil 17 and the magnetic flux from the magnets 18.

Then, the arm members 14 and 15 supporting the bobbin 12 to the yoke 13 are bent and swung in the leftward or rightward direction at the front and rear hinge portions 14a, 14b and 15a, 15b to thereby displace the bobbin 12 in the lateral direction or in the leftward or rightward direction.

The lateral displacement of the bobbin 12 is evenly carried out because the bobbin 12 and the yoke 13 are connected by the arm members 14 and 15 to form a parallelogram structure, that is, a third horizontal link as a whole, whereby the objective lens 11 is moved in the tracking direction. In this event, the flexible printed circuit boards 19 and 20 are flexibly moved by a telescopic elasticity of the distorted portions thereof in their vertical portions, thus allowing the bobbin 12 to move without any trouble.

Next, a second embodiment of the present invention will be explained with reference to FIG. 4. The second embodiment is adapted to an integral optical pickup in which the objective lens 11 and an optical pickup unit 21 are incorporated in a bobbin 22. Detailed explanation on parts in common with those in the first embodiment will be omitted.

The bobbin 22 of the second embodiment is made of heat-durable and highly rigid synthetic resin such as ABS resin or the like and formed in a housing shape. On the upper surface thereof, there is supported the objective lens 11 with its optical axis directing in the vertical direction. The bobbin 22 includes therein the optical pickup unit 21 which comprises therein a semiconductor laser as a light source, a beam splitter and a reflecting mirror for introducing a light beam from the semiconductor laser to the objective lens 11, a photo detector for detecting a returning beam reflected by an optical disc through the beam splitter and so on.

A yoke 23 of the second embodiment is constituted of a first yoke member 23a and a second yoke member 23b, both formed substantially in a "U" shape, which are angularly adjustably connected with each other at their both ends to form a quadrilateral frame. The first and second yoke members 23a and 23b respectively have inner yoke portions 23a₁ and 23b₁ inwardly protruded at the insides of yoke members 23a and 23b. Magnets 18 are secured to the inner surfaces of the front and rear walls of the yoke 23, that is, the inner surfaces of the first and second yoke members 23a and 23b which constitute a magnetic circuit with the yoke 23. Opposite to the magnets 18 there are disposed the driving coil 16 for focusing control and the driving coil 17 for tracking control which are wound on the bobbin 22.

Figure 5:
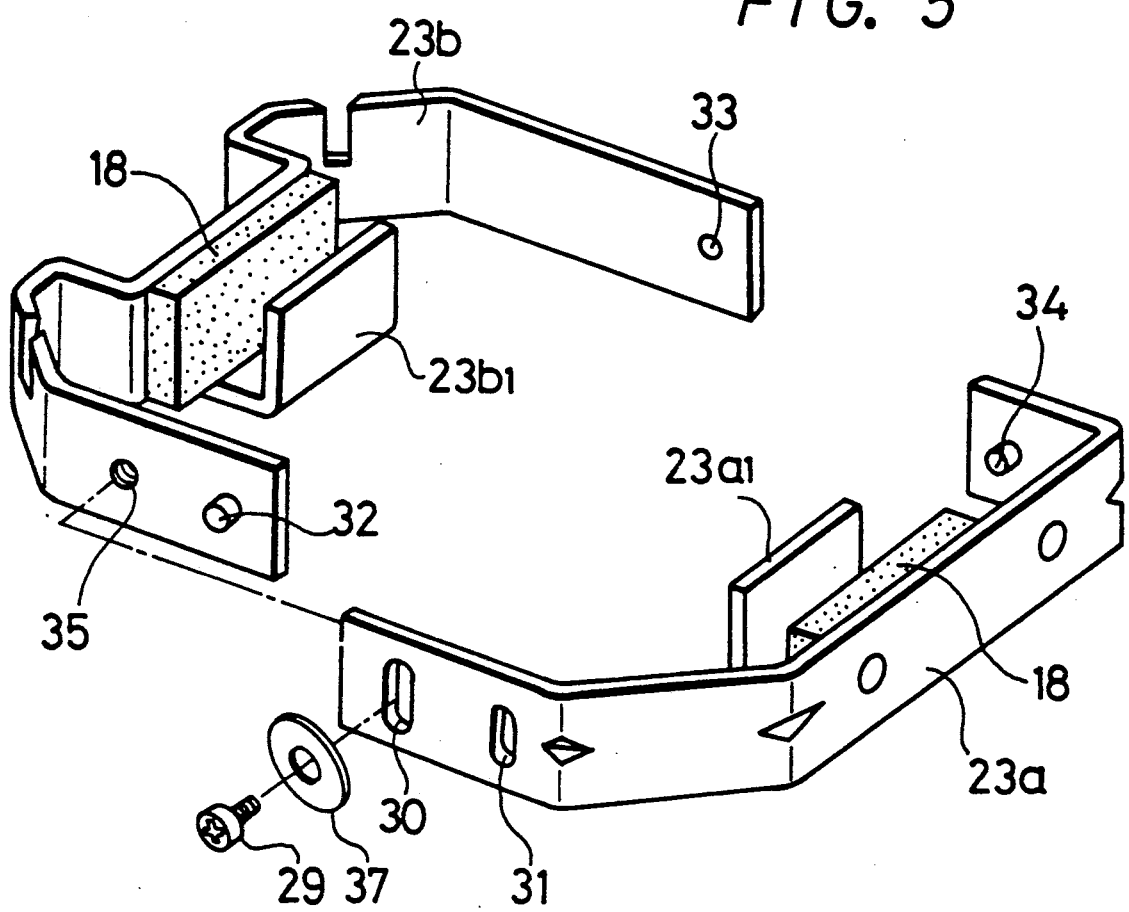
FIG. 5 is an exploded perspective view of a yoke serving as a frame.

Next, the construction of the yoke 23 utilized in the present embodiment will be explained with reference to FIG. 5.

As described above, the yoke 23 is constituted of the first and second yoke members 23a and 23b which are clamped at their two end portions by clamping means, with the second yoke member 23b being fitted inside the other, to form a quadrilateral frame. A vertically long guiding bore is formed through one end portion of the first yoke member 23a as a connecting portion. A vertically long angle adjusting bore 31 is also formed through the one end portion of the yoke member 23a with a predetermined distance from the guiding bore 30 to the front side. A dowel 34 is protrusively formed on the inner surface of the other end portion of the yoke member 23a.

On the other hand, a screw bore 35 is formed through one end portion of the second yoke member 23b corresponding to the guiding bore 30 of the first yoke member 23a. A dowel 32 is protrusively formed corresponding to the angle adjusting long bore 31 on the outer surface of the one end portion on the front side of the screw bore 35, that is, at a location near the end of the yoke member 23b. A reference bore 33 for angle adjustment is bored through the other end portion of the yoke member 23b corresponding to the dowel 34 of the first yoke member 23a.

To couple the first yoke member 23a with the second yoke member 23b, the two both end portions of the first yoke member 23a are fitted to the outside of the two end portions of the second yoke member 23b, wherein the dowel 32 is engaged with the angle adjusting long bore 31 and the dowel 34 is engaged with the angle adjusting reference bore 33 to thereby preliminarily couple the first and second yoke members 23a and 23b with each other. In this condition, a fixing screw 29 is screwed into the screw bore 35 of the second yoke member 23b through the guiding bore 30 of the first yoke member 23a and a washer 37, if necessary, whereby the both yoke members 23a and 23b are fastened with each other and also connected magnetically to form the yoke 23.

Figure 4:
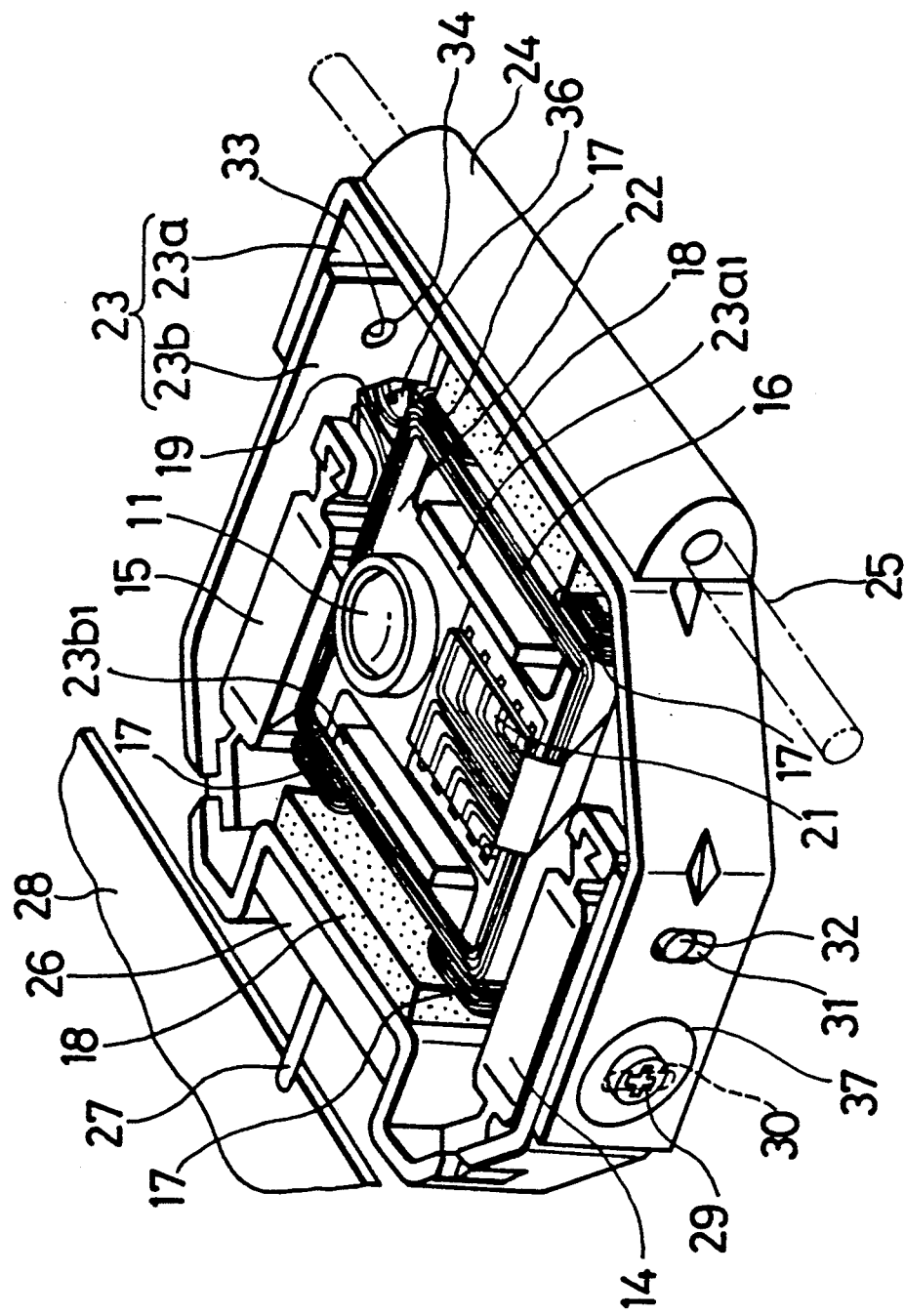
FIG. 4 is a perspective view showing a second embodiment of an objective lens driving apparatus according to the present invention.

As shown in FIG. 4, the yoke 23 thus constructed is provided on the front surface of the first yoke member 23a with a guiding shaft holder 24 which is penetrated by a guiding shaft 25 serving as a reference axis for movement.

Further, on the rear surface of the second yoke member 23b a level determining pin 27 is protrusively provided through a fixing block 26, the level determining pin 27 being in contact with the upper surface of a level determining base 28. Then, the bobbin 22 is supported on the yoke 23 by the arm members 14 and 15 in such a manner that the both driving coils 16 and 17 are disposed between the magnets 18 and the inner yokes 23a₁ and 23b₁. The arm members 14 and 15, which respectively have hinge portions and parallel links, have their rear faces fixed to the rear side of the yoke 23, i.e. the second yoke member 23b and their front end face fixed to the bobbin 22.

In FIG. 4, the reference numeral 36 designates a flexible printed circuit board as a leader for power supply which is led out from the yoke 23.

Also in the second embodiment constructed as described above, in the same manner as the aforementioned first embodiment, when the driving coil 16 for focusing control and the driving coil 17 for tracking control are supplied with a driving current, the bobbin 22 is moved in the direction parallel to the optical axis of the objective lens 11 and in the direction perpendicular to the optical axis by the swinging movement of the parallel links and the hinge portions of the arm members 14 and 15 to thereby displace the objective lens 11 for the focus and tracking controls.

In the optical pickup apparatus constructed and operating as described above, it is necessary to correct the inclination of the optical system, i.e. the objective lens 11 and optical pickup unit 21, with respect to the recording medium or optical disc. Such correction is effected, in the second embodiment, on the guiding shaft 25 which serves as a movement reference axis maintaining a positional relationship with the optical disc and the level determining base 28.

Specifically explaining, the guiding shaft holder 24 attached to the first yoke member 23a is penetrated by the guiding shaft 25 which limits the overall optical pickup apparatus to have rotating freedom only in the sending direction and the direction around the guiding shaft 25. On the other hand, the level determining pin 27 protrusively provided on the second yoke member 23b of the yoke 23 gets in contact with the level determining base 28 to limit the freedom only in the sending direction whereby the attitude of the optical pickup apparatus is determined. In this event, the inclination of the optical system including the objective lens 11 and so on is corrected with respect to the guiding shaft 25 and the level determining base 28.

Figure 6:
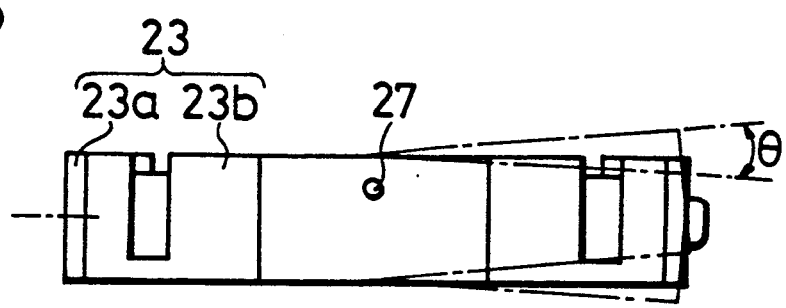
FIG. 6 is a back view of the objective lens driving apparatus shown in FIG. 4.
Figure 7:
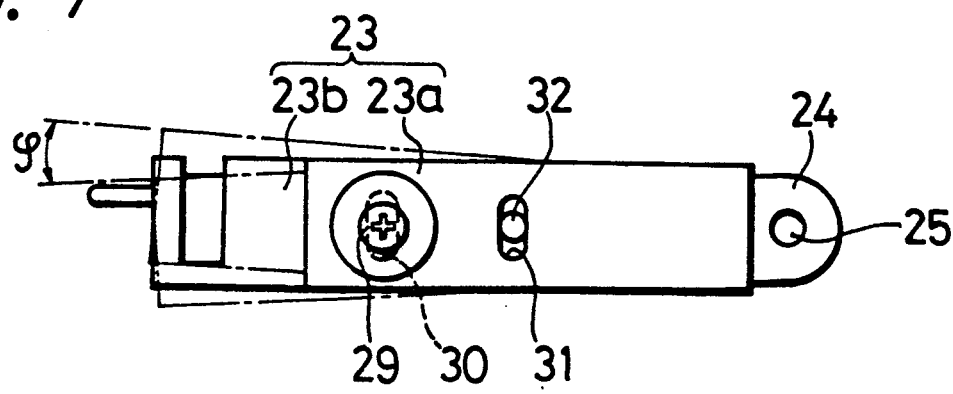
FIG. 7 is a side view of the objective lens driving apparatus shown in FIG. 4.

The above-mentioned correction on the inclination of the optical system including the objective lens 11 and so on is effected in two directions $\theta$ and $\phi$ as shown in FIGS. 6 and 7.

Referring first to FIG. 6, the correction in the direction $\theta$ is effected as follows:

In a condition that the fastening screw 29 for fastening the first and second yoke members 23a and 23b of the yoke 23 is loose, the position of the dowel 32 of the second yoke member 23b is changed with respect to the angle adjusting long bore 31 of the first yoke member 23a to form an angle in the direction $\theta$, whereby the bobbin 22 supported by the second yoke member 23b through the arm members 14 and 15 is inclined. In other words, the optical system including the objective lens 11 and so on is inclined with respect to the guiding shaft 25. As a result, the junction plane between the first and second yoke members 23a and 23b is displaced from the parallel plane by the angle $\theta$, however, such displacement is absorbed by the elasticity of the construction material.

On the other hand, the correction in the direction $\phi$ as shown in FIG. 7 is effected by rotating the second yoke member 23b with respect to the first yoke member 23a about the rotating axis extending from the engaged position of the angle adjusting long bore 31 and the dowel 32 to the engaging position of the dowel 34 and the angle adjusting reference bore 33 of the first and second yoke members 23a and 23b, without changing the engaging position (level) of the angle adjusting long bore 31 and the dowel 32 as is effected for the positioning in the direction $\theta$ as described above. By this manipulation, the optical system including the objective lens 11 and so on is inclined in the direction $\phi$.

After the optical system such as the objective lens 11 or the like has been appropriately corrected, the fastening screw 29 is fastened to fix the optical system in the corrected position. In other words, the optical system correcting mechanism is locked.

As described above, the present embodiment can correct the inclination of the optical system including the objective lens 11 and so on by adjusting the angle between the first and second yoke members 23a and 23b of the yoke 23.

FIGS. 8-10 show other examples of the arm members. Also for these examples, only one of the arm members will be explained.

Figure 8A:
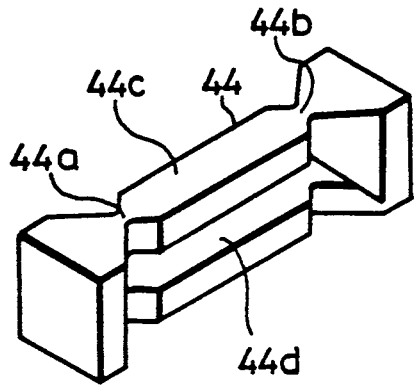
FIGS. 8A-8C are respectively a perspective view, a plan view and a side view of another example of the arm member.
Figure 8B:
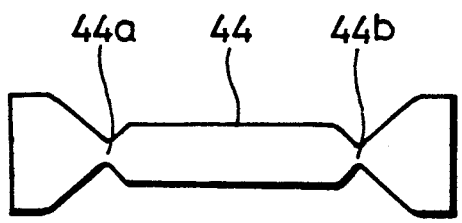
Figure 8C:
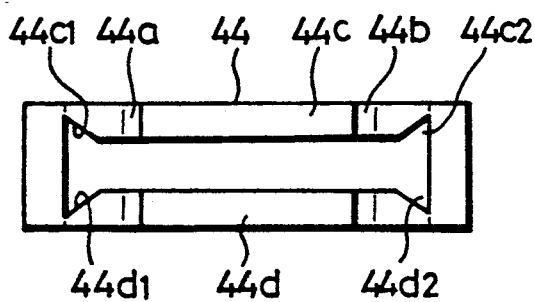

An arm member 44 shown in FIGS. 8A to 8C has the positional relationship between a pair of hinge portions 44a and 44b and flexible portions of parallel links 44c and 44d opposite to that of the arm member 14. Specifically, the parallel links 44c and 44d have their flexible portions $44c_1$, $44c_2$ and $44d_1$, $44d_2$ on the both end sides thereof formed at the both side ends of the arm member 44, while the pair of hinge portions 44a and 44b are formed at inside portions of the arm member 44. The arm member 44 thus constructed is provided with the parallel links 44c and 44d longer than those of the foregoing example, so that the recovery force of the objective lens 11 is reduced in the focusing control operation, thereby making it possible to increase the moving amount of the bobbin as moveable body relative to a voltage applied to the driving coil for focusing control, with the result that the movable area of the objective lens for the focusing control can be extended.

Figure 9A:
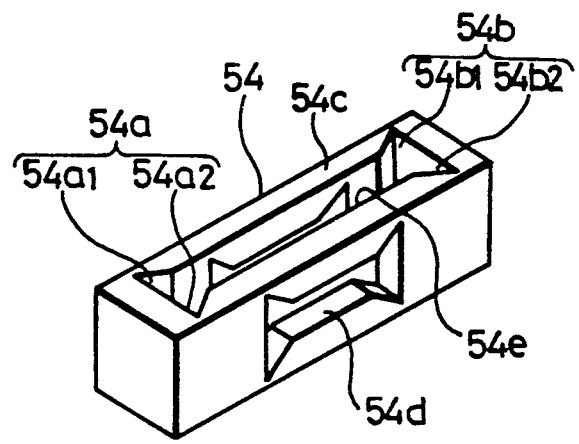
FIGS. 9A-9C are respectively a perspective view, a plan view and a side view of a yet further example of the arm member.
Figure 9B:
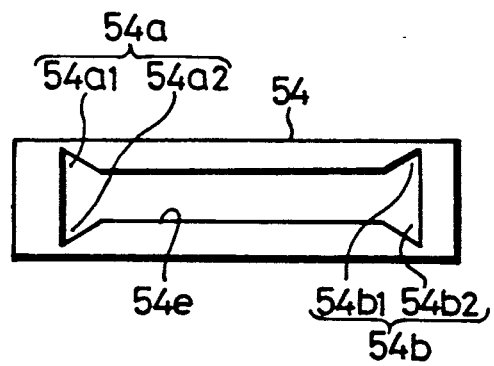
Figure 9C:
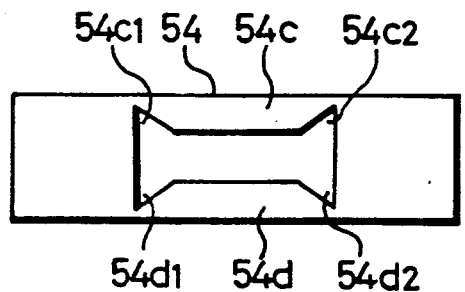

An arm member 54 shown in FIGS. 9A to 9C has a pair of hinge portions 54a and 54b made as a parallel link structure. More specifically, the hinge portions 54a and 54b are formed as flexible portions $54a_1$, $54a_2$ and $54b_1$, $54b_2$ cut in both sides of the front and rear end portions of an opening 54e formed long in the lengthwise direction through the top and bottom planes of the arm member 54. The parallel links 54c and 54d have their flexible portions $54c_1$, $54c_2$ and $54d_1$, $54d_2$ formed in the both end portions thereof, in the same manner as the aforementioned example. However, the parallel links of the present example we formed in a rod-like shape because of the opening 54e formed through the parallel link planes.

The arm member 54 thus constructed is advantageous in that each of arm members on the both sides can individually move when the bobbin is moved in the horizontal direction, i.e. in the tracking control operation of the objective lens.

Figure 10A:
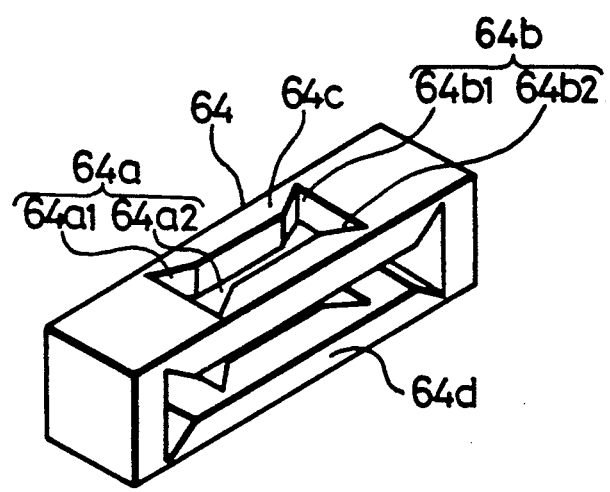
FIGS. 10A-10C are respectively a perspective view, a plan view and a side view of a yet further example of the arm member.
Figure 10B:
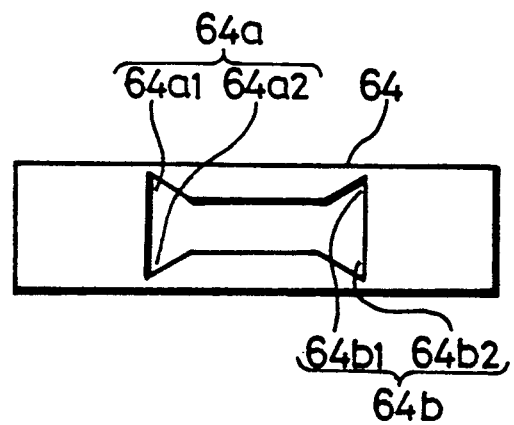
Figure 10C:
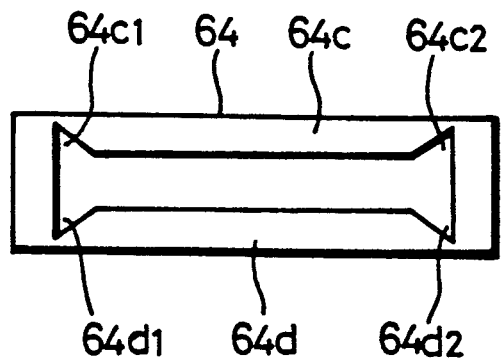

An arm member 64 shown in FIGS. 10A to 10C has flexible portions of hinge portions 64a and 64b and the parallel links 64c and 64d disposed in a positional relationship opposite to that of the arm member 54 shown in FIG. 9.

Specifically, flexible portions $65c_1$, $64c_2$ and $64d_1$, $64d_2$ at both sides of the parallel links 64c and 64d are formed at both end portions of the arm member 64, while parallel link-like flexible portions $64a_1$, $64a_2$ and $64b_1$, $64b_2$ serving as the hinge portions 64a and 64b are formed at inside portions of the arm member 64.

Since the arm member 64 of the present example thus constructed has the parallel links 64c and 64d longer than those of the foregoing examples, the recovery force of the objective lens is reduced in the focusing control operation, thereby making it possible to increase the moving amount of the bobbin as movable body with respect to a voltage applied to the driving coil for focusing control with the result that the movable area of the objective lens for the focusing control can be extended.

The arm members of the respective examples constructed as described above can be integrally molded of synthetic resin. The hinge portions and parallel links can have their vibration characteristics in the respective moving directions, that is, the tracking direction and the focusing direction individually set to support the objective lens with high accuracy by changing the thickness of the flexible portions thereof.

In the aforementioned second embodiment, for example, the objective lens 11 and the optical pickup unit 21 are attached to the bobbin 22. However, the present invention can be applied to a construction in which only the objective lens 11 is attached to the bobbin 22. Also, the members for supporting the bobbin 22 to the yoke 23 can be replaced by other alternatives.

The inclination of the optical system including the objective lens and so on is corrected by angularly adjusting the frame which supports the movable body to which the optical system is attached with respect to the reference member, so that the correcting operation is easily effected.

Further, since the correcting mechanism is disposed on the side of the optical system, it does not require spacing in the vertical or height direction, whereby the optical pickup apparatus can be made thin and accordingly the whole optical disc recording/reproducing apparatus can be reduced in thickness.

According to the present invention as described above, the movable body supporting an objective lens is supported on the frame by first and second supporting members each having a pair of hinge portions and first and second parallel links coupling the two hinge portions, so that movements of the movable body in the direction parallel to the optical axis of the objective lens and in the direction perpendicular to the optical axis are individually made by different flexible actions of the respective supporting members, whereby the torsional rigidity and inclination accuracy are maintained, with the result that the objective lens can be always precisely driven with stability. Also, since the movement of the movable body in the direction perpendicular to the optical axis of the objective lens is made by the parallel link mechanism, the movable body has a large freedom in shape so that the optical pickup apparatus can be reduced in thickness, and also the vibration characteristics can be set individually in the respective directions, thereby making it possible to extend the setting range and accordingly increase the freedom in design of the whole apparatus, with the result that a desired apparatus can be provided.

The above description is given on preferred embodiments of the invention but it will be apparent that many modifications and variations could be effected by one skilled in the art without departing from the spirit or scope of the novel concepts of the invention so that the scope of the invention should be determined by the appended claims only.

I claim as my invention:

1. An objective lens driving apparatus comprising:
a movable body connected to and supporting an objective lens having an optical axis;
electromagnetic driving means connected to said objective lens for driving said objective lens in a direction parallel to the optical axis and in a direction perpendicular to the optical axis;
first and second supporting members each having a pair of hinge portions and first and second parallel links coupling said pair of hinge portions; and
a frame to which said first and second supporting members are attached;
wherein said objective lens is constrained by the respective parallel links of said first and second supporting members to move in a direction parallel to the optical axis and wherein said movable body, a part of said frame and said first and second supporting members are connected to form a parallelogram structure and said objective lens is constrained by said parallelogram structure to move in a direction perpendicular to the optical axis.

2. An objective lens driving apparatus according to claim 1, wherein said first and second supporting members have two ends each with supporting portions formed respectively at one end thereof for supporting said movable body and attaching portions formed respectively at the other end thereof for being attached to said frame, said supporting and attaching portions of each supporting member being coupled by said first and second parallel links and said pair of hinge portions.

3. An objective lens driving apparatus according to claim 1, wherein said pair of hinge portions are formed so that a bending direction thereof is arranged in the direction perpendicular to the optical axis.

4. An objective lens driving apparatus according to claim 2, wherein said first and second parallel links of each supporting member are between said pair of hinge portions and provided adjacent to both ends of said supporting members with flexible portions which enable said objective lens to swing in the direction parallel to said optical axis.

5. An objective lens driving apparatus according to claim 2, wherein said first and second supporting members are provided adjacent to both ends of said supporting members with flexible portions which enable said objective lens to swing in the direction parallel to said optical axis, and said pair of hinge portions are between said flexible portions.

6. An objective lens driving apparatus according to claim 2, wherein said pair of hinge portions enable pivoting about a vertical axis.

7. An objective lens driving apparatus according to claim 1, wherein said first and second supporting members are integrally molded of a flexible synthetic resin.

8. An objective lens driving apparatus according to claim 1, wherein said frame comprises first and second frame members each formed substantially in a "U" shape and means for coupling said frame members together.

9. An objective lens driving apparatus comprising:
a movable body connected to and supporting an objective lens having an optical axis;
electromagnetic driving means connected to said objective lens for driving said objective lens in a direction parallel to the optical axis and in a direction perpendicular to the optical axis;
first and second supporting members each having a pair of hinge portions and first and second parallel links coupling said pair of hinge portions; and
a frame to which said first and second supporting members are attached;
wherein said objective lens is constrained by the respective parallel links of said first and second supporting members to move in a direction parallel to the optical axis and wherein said movable body, a part of said frame and said first and second supporting members are connected to form a parallelogram structure and said objective lens is constrained by said parallelogram structure to move in a direction perpendicular to the optical axis;
wherein said first and second supporting members have two ends each with supporting portions formed respectively at one end thereof for supporting said movable body and attaching portions formed respectively at the other end thereof for being attached to said frame, said supporting and attaching portions of each supporting member being coupled by said first and second parallel links and said pair of hinge portions;

wherein said pair of hinge portions enable pivoting about a vertical axis; and wherein each of said parallel links is formed with a pair of flexible second portions defined by openings respectively formed in said parallel links so as to enable said objective lens to swing in the direction parallel to said optical axis.

10. An objective lens driving apparatus according to claim 9, wherein said flexible second portions are between said hinge portions.

11. An objective lens driving apparatus according to claim 9, wherein said hinge portions are between said flexible second portions.

12. An objective lens driving apparatus comprising:

a movable body connected to and supporting an objective lens having an optical axis;

electromagnetic driving means connected to said objective lens for driving said objective lens in a direction parallel to the optical axis and in a direction perpendicular to the optical axis;

first and second supporting members each having a pair of hinge portions and first and second parallel links coupling said pair of hinge portions; and a frame to which said first and second supporting members are attached;

wherein said objective lens is constrained by the respective parallel links of said first and second supporting members to move in a direction parallel to the optical axis and wherein said movable body, a part of said frame and said first and second supporting members are connected to form a parallelogram structure and said objective lens is constrained by said parallelogram structure to move in a direction perpendicular to the optical axis;

wherein said frame comprises first and second frame members each formed substantially in a "U" shape and means for coupling said frame members together;

further comprising an angle adjusting mechanism for adjusting an angle of one of said first and second frame members with respect to the other.

13. An objective lens driving apparatus according to claim 12, wherein one of said frame members is formed with an elongate bore and further comprising a protrusion provided on the other of said frame members at a location corresponding to said elongate bore for adjustment of said angle.

14. An objective lens driving apparatus according to claim 12, wherein said adjusting mechanism is adapted to adjust the inclination of said optical axis.

15. An optical pickup apparatus comprising:

a movable body for supporting a laser light source, an objective lens having an optical axis, optical means for introducing a light beam from said laser light source to said objective lens and a light receiving element for receiving the light beam which passes through said objective lens and said optical means;

electromagnetic driving means for driving said movable body in a direction parallel to the optical axis and in a direction perpendicular to the optical axis;

first and second supporting members respectively formed with a pair of hinge portions and first and second parallel links coupling said pair of hinge portions for supporting said movable body; and a frame to which said first and second supporting members are attached;

wherein said movable body is constrained by the respective parallel links of said first and second supporting members to move in a direction parallel to the optical axis and wherein said movable body, a part of said frame and said first and second supporting members are connected to form a parallelogram structure and said objective lens is constrained by said parallelogram structure to move in a direction perpendicular to the optical axis.

16. An optical pickup apparatus according to claim 15, wherein said first and second supporting members have two ends each with supporting portions formed respectively at one end thereof for supporting said movable body and attaching portions formed respectively at the other end thereof for being attached to said frame, said supporting and attaching portions of each supporting member being coupled by said first and second parallel links and said pair of hinge portions.

17. An optical pickup apparatus according to claim 15, wherein said pair of hinge portions are formed so that a bending direction thereof is arranged in the direction perpendicular to the optical axis.

18. An optical pickup apparatus according to claim 16, wherein said first and second parallel links of each supporting member are between said pair of hinge portions and provided adjacent to both ends of said supporting members with flexible portions which enable said movable body to swing in the direction parallel to said optical axis.

19. An optical pickup apparatus according to claim 16, wherein said first and second supporting members are provided adjacent to both ends of said supporting members with flexible portions which enable said movable body to swing in the direction parallel to said optical axis, and said pair of hinge portions are between said flexible portions.

20. An optical pickup apparatus according to claim 16, wherein said pair of hinge portions enable pivoting about a vertical axis.

21. An optical pickup apparatus according to claim 15, wherein said first and second supporting members are integrally molded of a flexible synthetic resin.

22. An optical pickup apparatus according to claim 15, wherein said frame comprises a first and second frame members formed substantially in a "U" shape and means for coupling said frame members together.

23. An optical pickup apparatus comprising:

a movable body for supporting a laser light source, an objective lens having an optical axis, optical means for introducing a light beam from said laser light source to said objective lens and a light receiving element for receiving the light beam which passes through said objective lens and said optical means;

electromagnetic driving means for driving said movable body in a direction parallel to the optical axis and in a direction perpendicular to the optical axis;

first and second supporting members respectively formed with a pair of hinge portions and first and second parallel links coupling said pair of hinge portions for supporting said movable body; and a frame to which said first and second supporting members are attached;

wherein said movable body is constrained by the respective parallel links of said first and second supporting members to move in a direction parallel to the optical axis and wherein said movable body, a part of said frame and said first and second supporting members are connected to form a parallelogram structure and said objective lens is constrained by said parallelogram structure to move in a direction perpendicular to the optical axis;

wherein said first and second supporting members have two ends each with supporting portions formed respectively at one end thereof for supporting said movable body and attaching portions formed respectively at the other end thereof for being attached to said frame, said supporting and attaching portions of each supporting member being coupled by said first and second parallel links and said pair of hinge portions;

wherein said pair of hinge portions enable pivoting about a vertical axis; and wherein each of said parallel links is formed with a pair of flexible second portions defined by openings respectively formed in said parallel links so as to enable said movable body to swing in the direction parallel to said optical axis.

24. An optical apparatus according to claim 23, wherein said flexible second portions are between said hinge portions.

25. An optical pickup apparatus according to claim 23, wherein said hinge portions are between said flexible second portions.

26. An optical pickup apparatus comprising:

a movable body for supporting a laser light source, an objective lens having an optical axis, optical means for introducing a light beam from said laser light source to said objective lens and a light receiving element for receiving the light beam which passes through said objective lens and said optical means;

electromagnetic driving means for driving said movable body in a direction parallel to the optical axis and in a direction perpendicular to the optical axis;

first and second supporting members respectively formed with a pair of hinge portions and first and second parallel links coupling said pair of hinge portions for supporting said movable body; and a frame to which said first and second supporting members are attached;

wherein said movable body is constrained by the respective parallel links of said first and second supporting members to move in a direction parallel to the optical axis and wherein said movable body, a part of said frame and said first and second supporting members are connected to form a parallelogram structure and said objective lens is constrained by said parallelogram structure to move in a direction perpendicular to the optical axis; and wherein said frame comprises first and second frame members formed substantially in a "U" shape and means for coupling said frame members together;

further comprising an angle adjusting mechanism for adjusting an angle of one of said first and second frame members with respect to the other.

27. An optical pickup apparatus according to claim 26, wherein one of said frame members is formed with an elongate bore and further comprising a protrusion provided on the other of said frame members at a location corresponding to said elongate bore for adjustment of said angle.

28. An optical pickup apparatus according to claim 26, wherein said angle adjusting mechanism is adapted to adjust the inclination of said optical axis.

* * * * *

UNITED STATES PATENT AND TRADEMARK OFFICE
CERTIFICATE OF CORRECTION

PATENT NO. : 5,073,883

DATED : December 17, 1991

INVENTOR(S) : Koji Mitsumori

It is certified that error appears in the above-identified patent and that said Letters Patent is hereby corrected as shown below:

```
Col. 2, line 24, change "hing" to --hinge--
Col. 5, line 12, after "direction)" insert --,--
Col. 6, line 6, after "bore" insert --30--
        line 26, delete "both"
        line 45, "Further" should not be a new paragraph
        line 51, delete "the"
Col. 7, line 15, after "25" insert --,--
        lines 21 and 22, after "direction" insert --,--
Col. 8, line 33, delete "the" first occurrence
        line 35, change "we" to --are--
        line 39, after "of" insert --the--
        same line, delete "the"
```

UNITED STATES PATENT AND TRADEMARK OFFICE
CERTIFICATE OF CORRECTION

PATENT NO. : 5,073,883
DATED : December 17, 1991
INVENTOR(S) : Koji Mitsumori It is certified that error appears in the above-identified patent and that said Letters Patent is hereby corrected as shown below:

Col. 8, line 48, change "$65_{c1}$" to --$64_{c1}$-- line 61, after "control" insert --,--

In the Claims:

Col. 11, line 39, after "axis;" insert --and--
Col. 12, line 48, delete "a"

Signed and Sealed this

Twentieth Day of April, 1993

Attest:

MICHAEL K. KIRK

*Attesting Officer*     Acting Commissioner of Patents and Trademarks